United States Patent

Schultink et al.

[11] Patent Number: 6,017,411
[45] Date of Patent: Jan. 25, 2000

[54] METHOD OF MANUFACTURING A FILTER MATERIAL

[75] Inventors: Jan Schultink, Eksel; Frits Schultink, Neerpelt, both of Belgium

[73] Assignee: Airflo Europe N.V., Overpelt, Belgium

[21] Appl. No.: 08/799,038

[22] Filed: Feb. 10, 1997

[30] Foreign Application Priority Data

Feb. 9, 1996 [NL] Netherlands ............................ 1002295

[51] Int. Cl.[7] .......................... B32B 31/00; B32B 31/18; B32B 31/26
[52] U.S. Cl. .......................... 156/290; 156/292; 156/296; 156/308.4
[58] Field of Search .................................... 156/290, 292, 156/296, 308.2, 308.4

[56] References Cited

U.S. PATENT DOCUMENTS 4,504,539  3/1985  Petracek et al. ........................ 428/195

FOREIGN PATENT DOCUMENTS 92 16364  10/1992  WIPO .
93 16783  9/1993  WIPO .

Primary Examiner—Blaine Copenheaver
Attorney, Agent, or Firm—Young & Thompson

[57] ABSTRACT

For manufacturing filter material, a non-woven filter web is formed from electrostatically charged dielectric fibers. In order to give dimensional stability to the filter material without adversely affecting the permeability of the filter material, filaments or narrow strips are placed essentially at a distance from each other on at least one of the two sides of the filter web and fixed to the non-woven filter web.

9 Claims, 2 Drawing Sheets

METHOD OF MANUFACTURING A FILTER MATERIAL

FIELD OF THE INVENTION

The invention relates to a method for manufacturing filter material, comprising forming a non-woven filter web from electrostatically charged dielectric fibers.

BACKGROUND OF THE INVENTION

Such a method is known from EP-A-0626878. In this case, in order to improve the uniformity of the filter properties, a loose, open, non-stretch reinforcing textile material (scrim) is attached, after which both the filter web and the scrim undergo needle punching. Attaching a scrim does improve the dimensional stability of the product, but the textile material increases the pressure drop over the filter and makes the end product relatively expensive.

SUMMARY OF THE INVENTION

The object of the invention is to manufacture a filter material which has a uniform weight per unit area and high dimensional stability, and which exhibits a lower pressure drop over the filter material during use and is cheaper than the filter material according to EP-A-0626878.

To this end, according to the invention the method is characterized in that filaments or narrow strips are placed essentially at a distance from each other on at least one of the two sides of the filter web and fixed to the non-woven filter web.

The filaments or strips on each side of the filter web preferably do not intersect each other or touch each other.

In general, this will mean that the filaments or strips run essentially parallel to each other on each side of the filter web.

It is preferable for the filaments or strips to be made of two components: an inner component with a relatively high melting point and an outer component with a relatively low melting point. The filaments or strips are consequently fixed to the filter web by means of the molten outer material.

The filaments or strips can also be fixed to the filter material by means of glue.

In order to reduce the pressure loss as a result of compression of the filter material during the so-called calendering, the filter web will undergo needle punching before and/or after the placing of the filaments or narrow strips.

The stability and strength in two directions is achieved if the filaments or narrow strips are placed on the two sides of the filter web, the filaments or strips on one side of the filter web running crosswise relative to the filaments or strips on the other side of the filter web.

In order to fuse the filaments or narrow strips to the filter material, they are conveyed with the filter web into a nip between two heated calender rollers.

In the case of a product with filaments or strips in the lengthwise direction of the web and filaments or strips crosswise thereto the latter will preferably consist of pieces whose length is slightly greater than the width of the filter web, the ends of said pieces being glued to adhesive tapes and, after connection of the filaments or narrow strips to the filter web, the filaments or strips being severed on the inside of the tapes.

It is within the scope of the invention to place patterns of filaments or strips which intersect each other on one side or two sides of the filter web.

BRIEF DESCRIPTION OF THE DRAWING

The invention will now be explained in greater detail with reference to the figures.

DETAILED DESCRIPTION OF THE INVENTION

Figure 1:
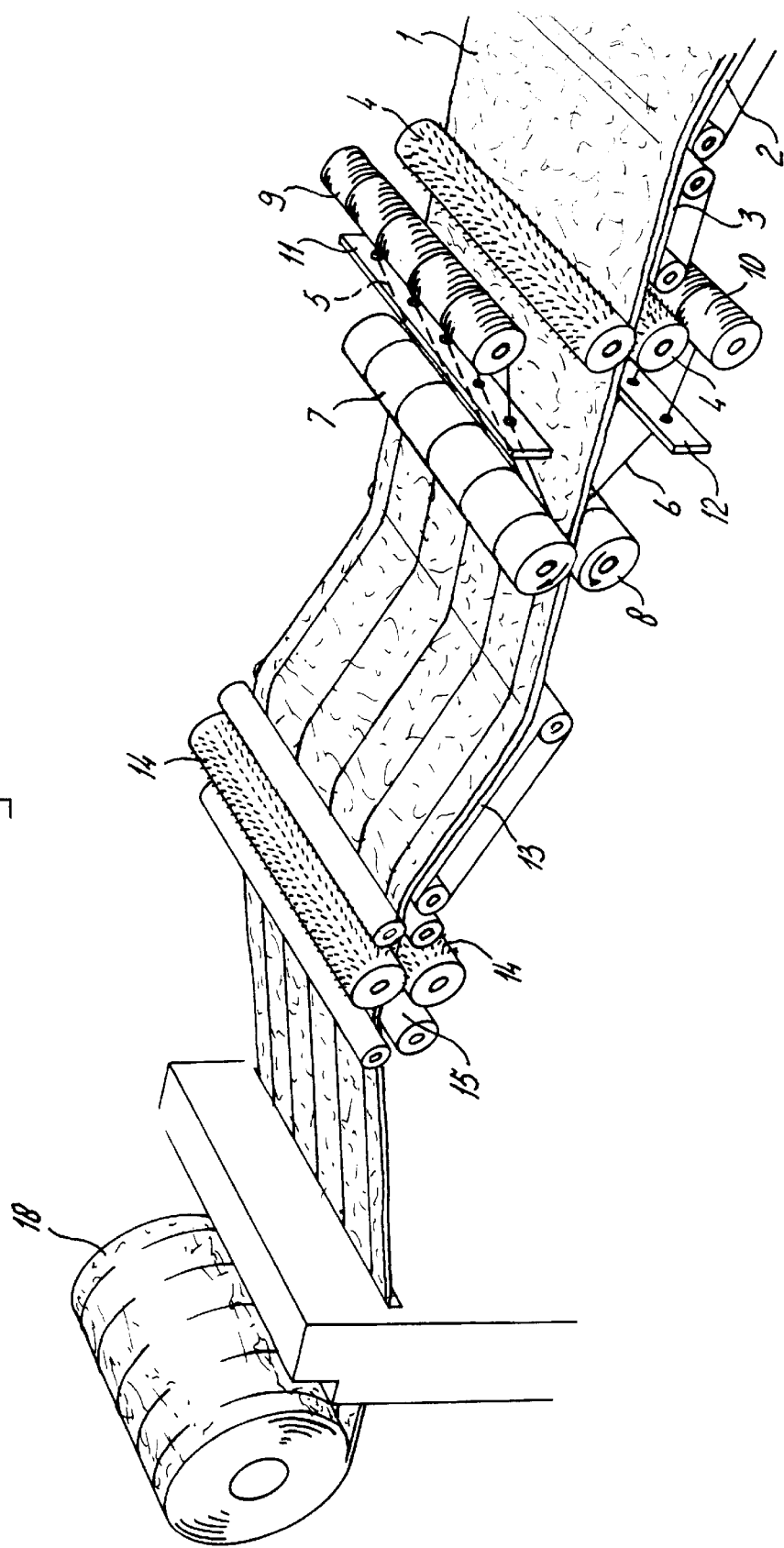
FIG. 1 shows diagrammatically and in perspective an exemplary embodiment of a device suitable for carrying out the method according to the invention.

It can be seen in FIG. 1 that a web of non-woven filter material 1 is being manufactured from electrically charged dielectric fibers in a manner which is known per se on a conveyor 2. The conveyor 2 conveys the material onto a conveyor 3, which leads to a needle punching device 4, in this case consisting of two rollers provided with needles. In this needle punching device approximately 50 holes per square centimeter are made in the non-woven filter material. The filter material treated in this way is conveyed, together with a number of parallel filaments 5 which are situated at a distance from each other above the filter web and a number of parallel filaments 6 which are situated at a distance from each other below the filter web, between two calender rollers 7 and 8 heated to, for example, 60° C., where the filaments are fixed to the non-woven material by fusing. The filaments come from rolls 9, 10 respectively and run through holes in plates or strips 11, 12 respectively, in order to place the filaments at the correct mutual distance.

The fusing temperature is selected at a value at which it does not cause any damage to the electrical properties of the fibers or strips.

The non-woven filter web which has been made dimensionally stable on the top and bottom surface by the filaments fused on in this way is conveyed on a conveyor 13 to a second needle punching device 14, where approximately 100 holes per square centimeter are made in the filter material by means of needles. The loss of permeability, caused by the compacting of the filter material by the calender rollers, is compensated for in this way.

Finally, the finished filter material is conveyed by way of guide rolls 15 to a drum 18, onto which said finished filter material is wound.

Better dimensional stability is achieved in the filter material if the parallel filaments on one side of the filter material extend at right angles to the parallel filaments on the other side of the filter material. When this is achieved, the filaments 5 on one side will extend in the direction of movement of the filter material. The filaments 16 on the other side are made of pieces which are slightly longer than the width of the filter material to be manufactured.

Figure 2:
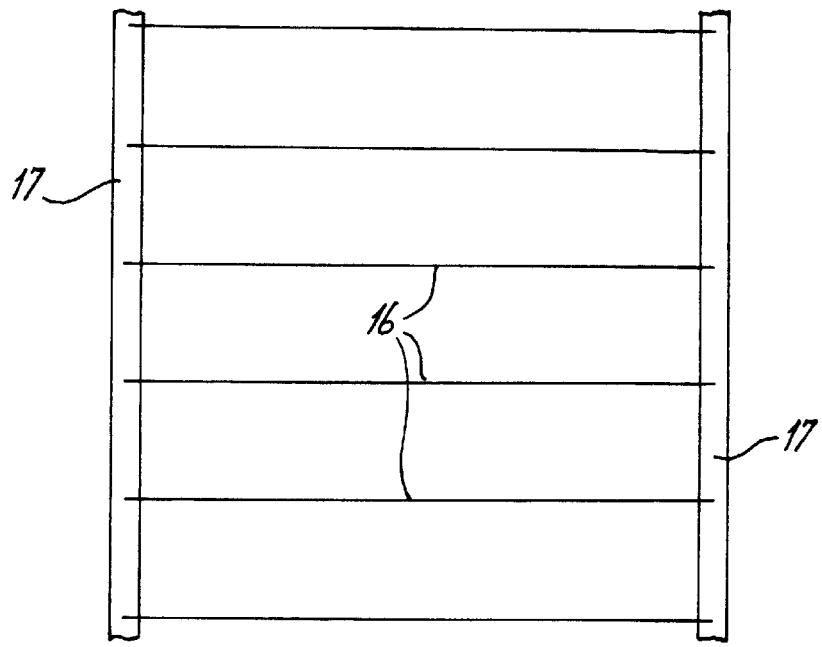
FIG. 2 shows an elevational view of a strip of filament pieces which are glued to tapes.
Figure 3:
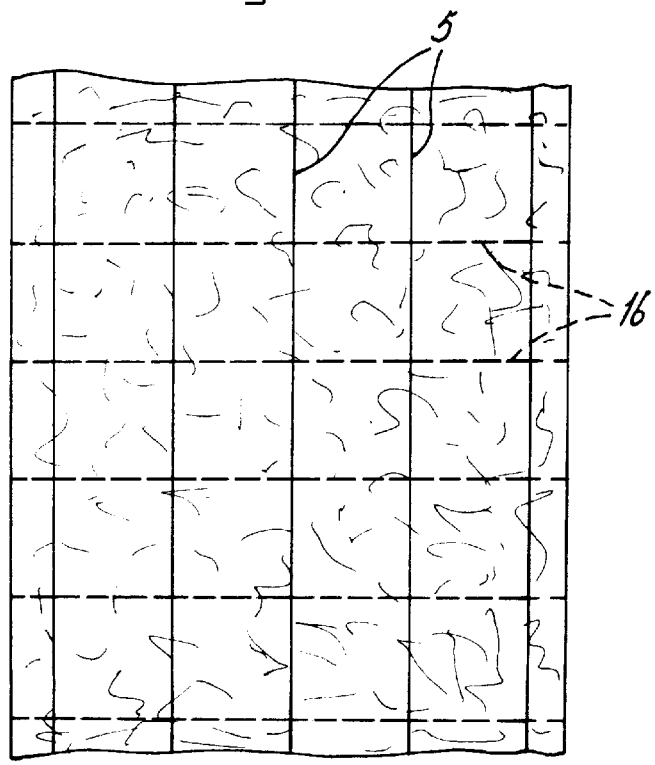
FIG. 3 shows filter material which has been manufactured with, inter alia, the filament pieces according to the invention shown in FIG. 2.

FIG. 2 shows that the ends of the filament pieces 16 are glued to tapes 17. The combination of filament pieces and tapes is conveyed to the nip between the calender rollers 7, 8, where the filament pieces are fused to, for example, the underside of the filter material. The end pieces of the filaments stuck to the tapes 17 are then cut away. The end product can be seen in FIG. 3. The filter material is resistant to tensile forces both in the direction of the filaments 5 and in the direction of the filaments 6 situated at right angles thereto.

In all embodiments the filaments have little or no adverse influence on the permeability of the finished filter material.

Where narrow strips are used instead of filaments, the permeability will actually decrease slightly, but the result is excellent.

The fusing of the filaments or narrow strips to the filter web could be replaced by gluing. The filaments or narrow strips can be made entirely of thermoplastic plastic, at least if they are made of one component and are being fused. Another good solution is the use of two-component filaments or strips, the inside of which is made of a material with high melting point, while a casing is made of a material with low melting point.

There is the possibility of placing the filament pieces on the filter web in the form of a zigzag pattern, successive pieces meeting at a common intersection point.

What is essential for the end product is that the filaments or narrow strips leave the surface virtually entirely clear on both sides of the filter web.

We claim:

1. Method for manufacturing filter material, comprising:
   forming a non-woven filter web from electrostatically charged dielectric fibers;
   placing filaments or narrow strips essentially at a distance from each other on at least one of the two sides of the non-woven filter web in a way that the filaments or narrow strips do not intersect or touch each other; and
   fixing the filaments or narrow strips to the non-woven filter web.

2. Method according to claim 1, wherein the filaments or narrow strips are fixed to the filter web by fusing.

3. Method according to claim 1, wherein the filaments or narrow strips are fixed to the filter web by means of glue.

4. Method according to claim 1, wherein the filaments or narrow strips are made of two components: an inner component with a relatively high melting point, and an outer component with a relatively low melting point.

5. Method according to claim 1, wherein the filter web undergoes needle punching before placing the filaments or narrow strips.

6. Method according to claim 1, wherein the filter web undergoes needle punching after placing the filaments or narrow strips.

7. Method according to claim 1, wherein the filaments or narrow strips are placed on the two sides of the filter web, the filaments or strips on one side of the filter web running crosswise relative to the filaments or strips on the other side of the filter web.

8. Method according to claim 1, wherein the filaments or narrow strips are fixed to the filter web by conveying the filaments or narrow strips together with the filter web into the nip between two heated calendar rollers thereby fusing the filaments or narrow strips to the filter web.

9. Method according to claim 1, wherein the filaments or narrow strips are placed on the two sides of the filter web, the filaments or strips on one side of the filter web running crosswise relative to the filaments or strips on the other side of the filter web, the filaments or narrow strips which are to be placed at right angles to the direction of movement of the filter web consisting of pieces whose length is slightly greater than the width of the filter web, and wherein the ends of said pieces are glued to adhesive tapes and, after connection of the filaments or narrow strips to the filter web, the filaments or narrow strips are severed on the inside of the tapes.

* * * * *

Disclaimer

6,017,411 B1-Schultink et al., Overpelt, (BE). METHOD OF MANUFACTURING A FILTER MATERIAL. Patent dated Jan. 25, 2001. Disclaimer filed May 4, 2007, by the inventor.

Hereby enters this disclaimer to claims 1-9 of said patent.

*(Official Gazette February 19, 2008)*